(12) United States Patent
Delhomme et al.

(10) Patent No.: US 8,164,797 B2
(45) Date of Patent: Apr. 24, 2012

(54) PROCESS AND DEVICE FOR DIGITISING A DOCUMENT

(75) Inventors: Jeremy Delhomme, Paris (FR); Joël-Yann Fourre, Paris (FR); Marina Pouet, Paris (FR); François Rieul, Paris (FR)

(73) Assignee: Morpho, Paris (FR)

( * ) Notice: Subject to any disclaimer, the term of this patent is extended or adjusted under 35 U.S.C. 154(b) by 583 days.

(21) Appl. No.: 12/227,199

(22) PCT Filed: May 14, 2007

(86) PCT No.: PCT/EP2007/054612
§ 371 (c)(1),
(2), (4) Date: Nov. 7, 2008

(87) PCT Pub. No.: WO2007/134996
PCT Pub. Date: Nov. 29, 2007

(65) Prior Publication Data
US 2009/0190188 A1    Jul. 30, 2009

(30) Foreign Application Priority Data
May 24, 2006   (FR) .................................... 06/04665

(51) Int. Cl.
*H04N 1/40* (2006.01)
(52) U.S. Cl. ........................ 358/3.26; 358/468; 358/474

(58) Field of Classification Search .................... 358/1.9, 358/2.1, 3.26, 500, 400, 468, 1.1, 1.18, 504–506, 358/408, 474, 486–494, 497
See application file for complete search history.

(56) References Cited

U.S. PATENT DOCUMENTS

| 4,511,242 A * | 4/1985 | Ashbee et al. ................ 399/395 |
| 4,843,480 A | 6/1989 | Nishikawa et al. |
| 6,912,325 B2 * | 6/2005 | Rombola et al. .............. 382/289 |
| 2003/0038993 A1 * | 2/2003 | Tseng et al. .................. 358/504 |

FOREIGN PATENT DOCUMENTS

| JP | 2004336393 A | * 11/2004 |
| KR | 10-2004-0096067 | 11/2004 |

* cited by examiner

*Primary Examiner* — Thomas D Lee
*Assistant Examiner* — Stephen M Brinich
(74) *Attorney, Agent, or Firm* — Blakely, Sokoloff, Taylor & Zafman

(57) ABSTRACT

The invention relates to a process for digitizing document in which the document (4) is feed driven in front of a sensor (2) by a drive mechanism (3) comprising a plurality of elements (31-36) which come into contact with the document (4) while it is fed, wherein the sensor (2) is capable of generating digital data from an image on the document (4), wherein the process comprises steps consisting of: —detecting when the contact is established or broken between the document (4) and one of the elements (32), —correcting the digital data by applying to the data a distortion correction function which takes into account the position of the sensor (2) with respect to the image when the detection takes place.

13 Claims, 2 Drawing Sheets

PROCESS AND DEVICE FOR DIGITISING A DOCUMENT

Figure 1:
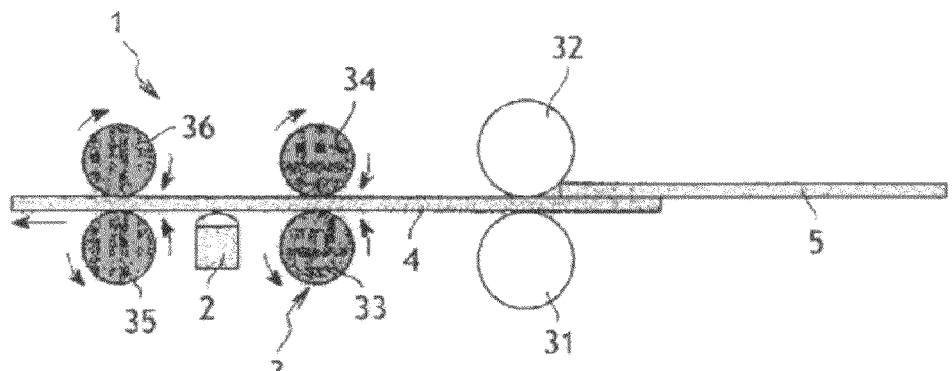

The present patent application is a Utility claiming the benefit of Application No. PCT/EP2007/054612, filed May 14, 2007.

The invention relates to a process for digitising documents.

In some types of application, it must be possible to digitise a large number of documents in a limited time and with high quality.

This is the case in the context of applications related to security, for example when it is required to digitise sheets containing fingerprints.

Typically, these sheets have to be digitised at rates of the order of 20 pages per minute.

Furthermore, quality standards define geometric precision criteria for the digitisation.

For example, the "IAFIS Image Quality Specification" standard (defined in document IAFIS-DOC-0178-7.1, May 2, 2005, Appendix F, Federal Bureau of Investigation, CJIS Division), requires a digitisation resolution equal to 500 dpi (dots per inch) ±1% and a distortion equal to ±0.0007 inches (namely 0.01778 mm) for a distance of between 0 and 0.07 inches (between 0 and 1.78 mm) and equal to ±1% for a distance of between 0.07 inches and 1.5 inches (between 1.78 and 38.1 mm).

The use of scrolling scanners in which a document is moved by a drive mechanism in front of a fixed sensor cannot usually achieve such geometric precision criteria.

In particular, regularity defects have been observed in the resolution along the direction in which the document is scrolled. In particular, it has been noticed that these defects are due to variations in the document scrolling speed, these variations being related to operation of the drive mechanism.

These disadvantages prevent the use of this type of scanner for applications that require a high precision of digitisation resolution.

One purpose of the invention is to improve the resolution of digital data obtained using a scrolling scanner.

To achieve this, the invention proposes a process for digitising a document by which the document is scrolled in front of a sensor by a drive mechanism comprising a plurality of devices that come into contact with the document as it scrolls, the sensor being capable of generating digital data from an image appearing on the document, the process including steps of:

detecting an initial contact or a break in the contact between the document and one of the devices, correcting digital data by applying a distortion correction function to the data that takes account of the position of the sensor relative to the image at the time of the detection.

In this process, the detection step allows to fix the distortion correction function taking account of variations in the document advance speed due to the initial contact or a break in the contact between the document and the devices in the drive mechanism.

Thus, this process can result in the correction of resolution regularity defects along the direction in which the document scrolls.

The process may also include the following characteristics:

the devices include rolls, between which the document is scrolled forwards, the initial contact or the break in the contact is detected using a sensor capable of measuring a turn of a roll, the process includes a step of inserting marking data within the digital data defining the position of the sensor relative to the image at the time of detection, the insertion step uses a light source arranged facing the sensor, the step to insert marking data includes a step of controlling activation or deactivation of the light source at the time that the initial contact or the break in the contact is detected, the process includes a preliminary calibration operation including steps of scrolling a document on which there is a reference image in front of the sensor, and using the digital data obtained to define a distortion correction function, the reference image represents a target formed by a pattern with known geometric characteristics.

The invention also relates to a document digitisation device of the type including a sensor capable of generating digital data from an image appearing on the document, and a drive mechanism to scroll the document in front of the sensor, the drive mechanism including a plurality of devices coming into contact with the document while the movement is taking place, characterised in that the device also comprises means for detecting initial contact or break in the contact between the document and one of the devices, and means for correcting the digital data by applying a distortion correction function to the data, that takes account of a position of the sensor relative to the image at the time of the detection.

The device may also have the following characteristics:

devices include rolls, between which the document is scrolled forwards, the means for detecting the initial contact or the break in the contact include a sensor capable of measuring a turn of a roll, the device includes means for inserting marking data into the digital data to define the position of the sensor relative to the image at the time of detection, the means for inserting marking data include a light source arranged facing the sensor, the means for inserting marking data include means for controlling activation or deactivation of the light source at the time that initial contact or break in the contact is detected, the distortion function is defined from digital data obtained from a document on which a reference image appears.

Figure 2:
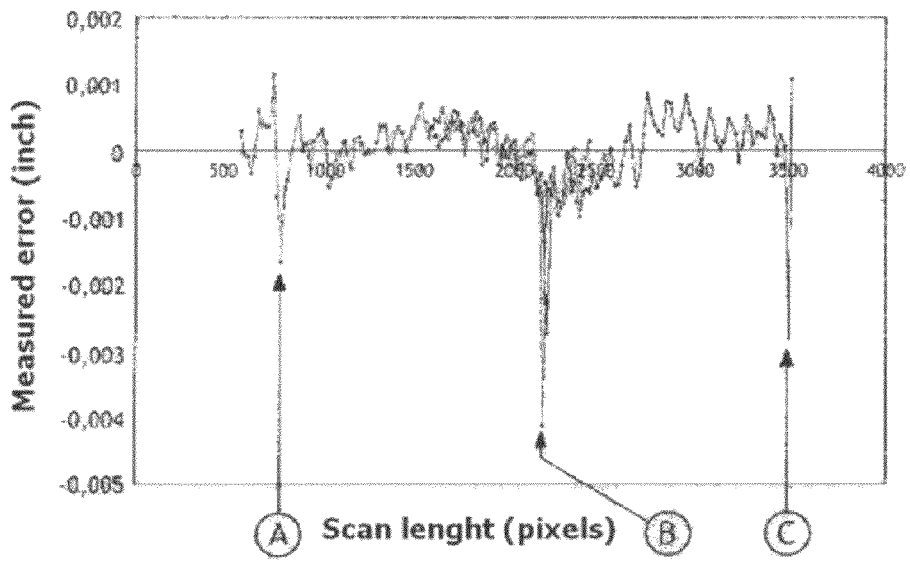
Figure 3:
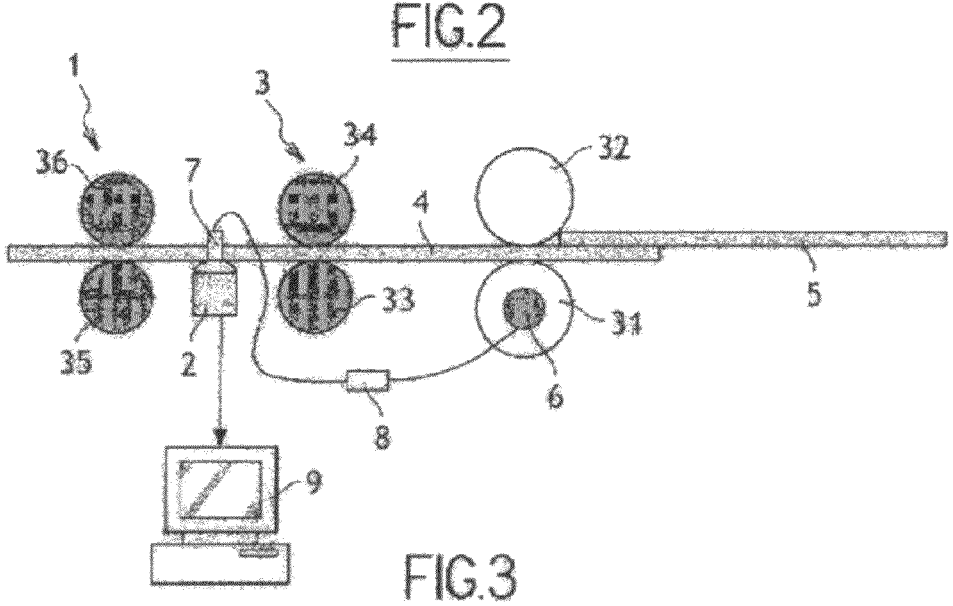
Figure 4:
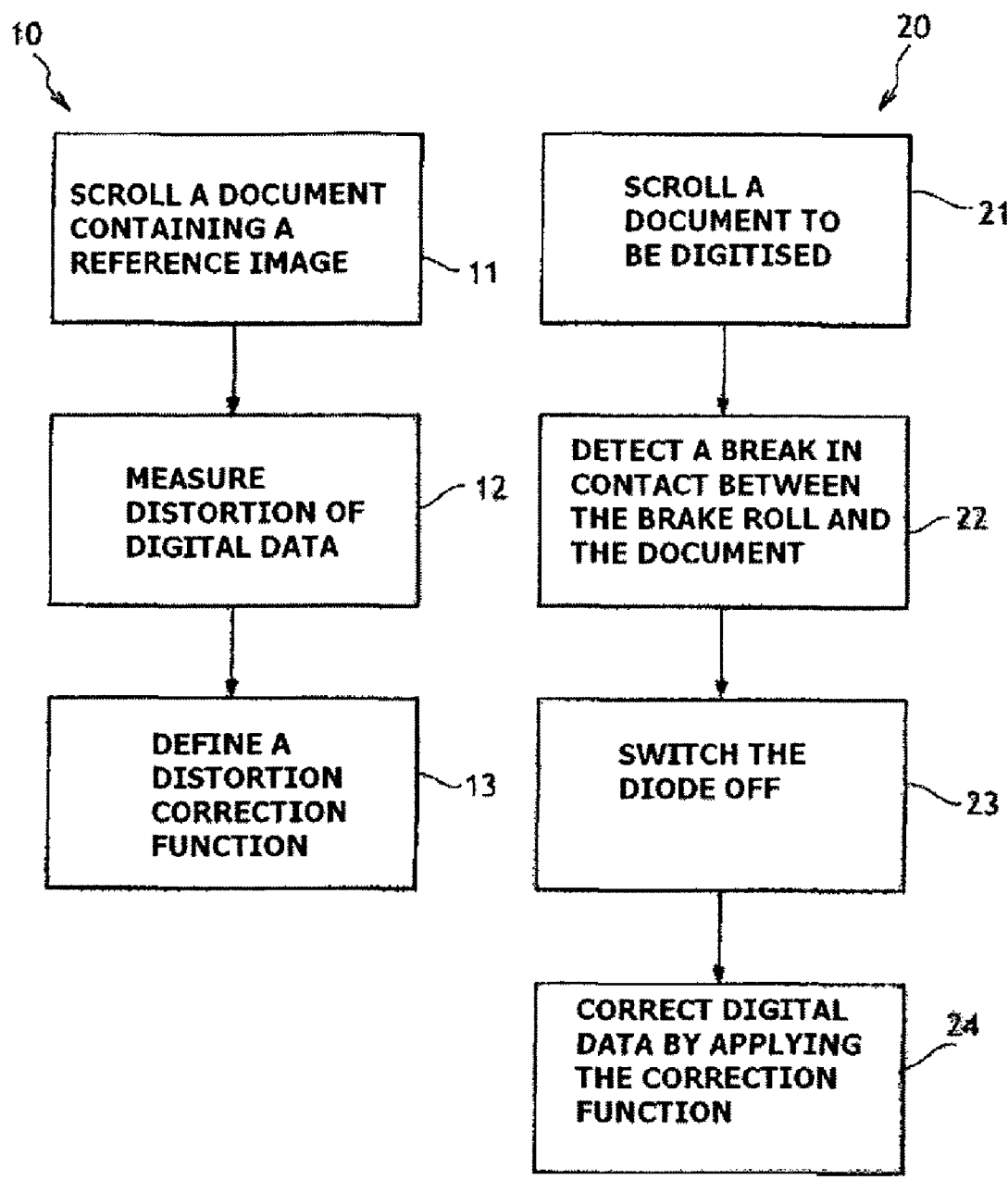

Other characteristics and advantages will become clear from the following description that is presented purely for illustrative and non-limitative purposes and that should be read with reference to the appended figures among which:

FIG. 1 diagrammatically shows a drive mechanism for a scrolling scanner,

FIG. 2 diagrammatically shows a distortion curve measured as a function of the document position as it scrolls, FIG. 3 diagrammatically shows a digitisation device conforming to one embodiment of the invention, FIG. 4 diagrammatically shows steps in a digitisation process conforming to one embodiment of the invention.

In FIG. 1, the scrolling scanner 1 comprises a fixed sensor 2 and a drive mechanism 3 capable of driving a document 4 of a sheet in a scrolling movement in front of the sensor 2.

As the document 4 is scrolled, the sensor 2 is capable of generating digital data from an image appearing on the document.

The drive mechanism 3 comprises an insertion roll 31 and a brake roll 32 facing the insertion roll 31. When the insertion roll 31 is driven in rotation, it is capable of picking up the sheet 4 and inserting it into the drive mechanism 3 to initiate scrolling of the sheet. The sheet 4 is inserted between the insertion roll 31 and the brake roll 32.

The brake roll 32 is installed in rotation and is coupled to a brake device (not shown) that opposes rotation of the brake roll. The brake roll 32 firstly holds the sheet 4 in contact with the insertion roll 31 and secondly retains the next sheet 5 to prevent several sheets from being picked up at the same time.

The drive device 3 also comprises drive rolls 33, 34, 35, 36 arranged along the scrolling trajectory of the document. The sheet 4 is driven in a scrolling movement between the drive rolls 33, 34, 35, 36 due to the rolls being in contact with the faces of the sheet 4.

The drive rolls 33, 34, 35, 36 are arranged in pairs. The rolls 33, 34, 35, 36 in a single pair extend on each side of the scroll trajectory of the sheet 4. Furthermore, the pairs of rolls 33, 34 and 35, 36 are arranged on the input and output side of the sensor 2 respectively, relative to the direction of scrolling of the sheet 4 so as to keep an area of the sheet 4 facing the sensor 2 in tension.

It can be understood that as the sheet 4 is scrolled forwards, it passes through several successive drive phases. During a first phase, the sheet 4 is in contact with the insertion roll 31 and with the brake roll 32 only. During this first phase, the sheet 4 does not extend in front of the sensor 2. Then during a second phase, the sheet 4 is in contact with both the insertion roll 31 and the brake roll 32 and with the drive rolls 33, 34, 35, 36. Finally, during a third phase, the sheet 4 is in contact with drive rolls 33, 34, 35, 36 only. The transition between the second and third drive phases generates changes to the drive speed of the sheet 4 as it moves forwards in front of the sensor 2. The consequence of this is to create regularity defects in the resolution of digital data along the scrolling direction of the sheet.

FIG. 2 is a diagram representing a measured distortion curve (in inches) of digital data generated by the sensor 2 as a function of the position of a sheet (in pixels) relative to the sensor 2 as the sheet is scrolled.

The curve in FIG. 2 was obtained by scrolling a document on which there is a reference image, in other words an image comprising a pattern for which the geometric parameters are known precisely, in front of the sensor 2.

The reference image represents a target typically formed by repetition of a pattern comprising an alternation of bands or lines, arranged at a predetermined interval, the bands or lines extending approximately perpendicular to the scrolling direction of the reference document. For example, the target may be a periodic Ronchi target representing a spatial frequency of 1 cycle per millimetre.

FIG. 2 shows strong distortions close to a first edge of the sheet (A) at the beginning of scrolling and at a second edge of the sheet (C) at the end of scrolling.

It can also be seen that the maximum error generated in the digital data occurs during the transition (B) between the second phase (during which the sheet is in contact with the brake roll) and the third phase (during which the sheet is no longer in contact with the brake roll). In other words, the maximum distortion occurs at the time that contact between the document and the brake roll is broken, because the brake roll suddenly stops applying a brake force on the document.

FIG. 3 diagrammatically shows a digitisation device conforming to one embodiment of the invention.

The device 1 comprises a fixed sensor 2 and a drive mechanism 3 conforming to the device in FIG. 1.

The device 1 in FIG. 3 also comprises a rotation sensor 6 such as an optical encoder or a Hall effect sensor coupled to the insertion roll 31. The rotation sensor 6 can generate an electrical signal representing the position or the rotation speed of the insertion roll 31.

The device 1 also comprises a light source 7 in the form of a light emitting diode and a source control circuit 8. The source 7 is placed facing the fixed sensor 2 on one side of the document scrolling trajectory 4. The control circuit 8 receives the signal generated by the rotation sensor 6 as an input and generates a power supply current for the light source 7 as an output. More precisely, the control circuit 8 can control the source 7 to selectively switch the source on or off.

Furthermore, the device 1 comprises processing means 9 in the form of a computer 9. The processing means 9 receive digital data from the fixed sensor 2 and are programmed to apply processing to the digital data, the processing including particularly correction of digital data by application of a distortion correction function.

FIG. 4 diagrammatically shows the steps in a digitisation process according to one embodiment of the invention.

The process includes a preliminary calibration operation 10 of the digitisation device. The calibration operation includes the following steps.

According to a first step 11, a document on which there is a reference image is scrolled in front of the sensor 2.

According to a second step 12, digital data generated by the sensor 2 are used to measure data distortions as the document is scrolled.

A distortion correction function is deduced in a third step 13. The distortion correction function is defined as being an inverse transformation of distortions measured during the second step 12. The distortion calculation function consists of resampling pixel lines in the digital data obtained.

The distortion correction function is associated with the drive mechanism of the digitisation device. The calibration operation is thus carried out once and for all for a given digitisation device 1. This correction function is then used during each document digitisation operation.

The process then includes a document digitisation operation 20. The digitisation operation includes the following steps.

In a first step 21, the document 4 to be digitised is scrolled in front of the sensor 2. The document 4 may for example be a document containing security information such as an image of a fingerprint.

As the document 4 is scrolled, the rotation sensor 6 detects rotation of the insertion roll 31 and generates an output signal that represents the rotation speed of the insertion roll 31.

As long as the insertion roll 31 is driven in rotation, the control circuit 8 transmits a power supply current to the light source 7 to keep the source 7 on.

Because the source 7 is arranged facing the digitisation sensor 2, the digitisation sensor 2 generates digital data that include not only the image that appears on the document, but also a white line that extends along the edge of the image, the white line being generated by the light source 7 that is on.

In a second step 22, as the document 4 advances, a break in the contact is observed between the document 4 and the brake roll 32.

When contact is broken, the velocity of the insertion roll 31 decreases suddenly and stops. The rotation sensor 31 then generates an output signal that decreases and stops, indicating that the insertion roll 31 is no longer rotating.

The control circuit 8 detects that the output signal of the rotation sensor has stopped. To achieve this, the control circuit 8 compares the output signal from the rotation sensor 6 with a predefined threshold value.

The light source 7 is switched off in a third step 23.

When the output signal generated by the rotation sensor 6 drops below the threshold value, the control circuit 8 stops powering the light source 7 such that the light source 7 goes off.

When the source 7 goes off, the white line generated by the source 7 in the digital data is interrupted and is extended by a black line.

The transition between the white line and the black line forms a locating mark inserted in the digital data, the locating mark defining the position of the sensor 2 relative to the image at the time that the break in the contact between the document 4 and the brake roll 32 is detected.

According to a fourth step 24, a distortion correction function is applied to the digital data obtained taking account of the position of the sensor 2 relative to the image at the time of the detection.

In other words, the locating mark in the digital data fixes the distortion correction function and thus gives corrected digital data with a low distortion rate.

One advantage of the device shown in FIG. 3 and the process shown in FIG. 4 is that variations in the scrolling speed are detected directly on the drive mechanism, by measuring a movement parameter of a device in this mechanism. Consequently, the proposed device and process enable a correction of digital data particularly suitable for a given drive mechanism.

Furthermore, the proposed device and process can be made from simple equipment.

Note that in most scrolling scanner type digitisation equipment, the resolution of digitisation depends on the document advance speed. Thus, in order to apply the process according to the invention, it is preferable to scroll the document so as to obtain a resolution better than the final resolution to be obtained. For example, in order to obtain corrected digital data with a resolution of at least 500 dpi (dots per inch) ±1%, the document is scrolled at a speed that can give an initial resolution of 600 dpi (dots per inch) to take account of information losses that may be generated during the digital data correction step.

The invention claimed is:

1. A Process for digitising a document by which the document is scrolled in front of a sensor by a drive mechanism comprising a plurality of devices that come into contact with the document as it scrolls, the sensor being capable of generating digital data from an image appearing on the document, the process including steps of:
    detecting an initial contact or a break in the contact between the document and one of the devices,
    correcting digital data by applying a distortion correction function to the data that takes account of the position of the sensor relative to the image at the time of the detection, wherein the initial contact or the break in the contact is detected using a sensor cable of measuring a turn of a roll.

2. The process according to claim 1, in which the plurality of devices comprise rolls between which the document is entrained in its scrolling movement.

3. The process according to claim 1 or claim 2, including a step of:
    inserting marking data within the digital data defining the position of the sensor relative to the image at the time of detection.

4. The process according to claim 3, in which the insertion step uses a light source arranged facing the sensor.

5. The process according to claim 4, in which the step to insert marking data includes a step of controlling activation or deactivation of the light source at the time that the initial contact or the break in the contact is detected.

6. The process according to claim 1, including a preliminary calibration operation comprising:
    scrolling a document on which there is a reference image in front of the sensor;
    using the digital data obtained to define a distortion correction function.

7. The process according to claim 6, in which the reference image represents a target formed by a pattern with known geometric characteristics.

8. A digitisation device for digitising a document, of the type including a sensor capable of generating digital data from an image appearing on the document, and a drive mechanism to scroll the document in front of the sensor, the drive mechanism including a plurality of devices coming into contact with the document while the movement is taking place, wherein the digitization device further comprises;
    means for detecting initial contact or break in the contact between the document and one of the plurality of devices,
    means for correcting the digital data by applying a distortion correction function to the data, that takes account of a position of the sensor relative to the image at the time of the detection; and
    means for inserting marking data into the digital data to define the position of the sensor relative to the image at the time of detection.

9. A device according to claim 8, in which the plurality of devices include rolls between which the document is scrolled forwards.

10. A device according to claim 9, in which the means for detecting the initial contact or the break in the contact include a sensor capable of measuring a turn of a roll.

11. A device according to claim 10, in which the means for inserting marking data include a light source arranged facing the sensor.

12. A device according to claim 11, in which the means for inserting marking data include means for controlling activation or deactivation of the light source at the time that initial contact or break in the contact is detected.

13. A device according to claim 8 wherein the distortion function is defined from digital data obtained from a document on which a reference image appears.

* * * * *

UNITED STATES PATENT AND TRADEMARK OFFICE
CERTIFICATE OF CORRECTION

| | | |
|---|---|---|
| PATENT NO. | : 8,164,797 B2 | Page 1 of 1 |
| APPLICATION NO. | : 12/227199 | |
| DATED | : April 24, 2012 | |
| INVENTOR(S) | : Jeremy Delhomme et al. | |

It is certified that error appears in the above-identified patent and that said Letters Patent is hereby corrected as shown below:

Column 5, Claim 1, line 53, delete "cable" and insert -- capable --.

Signed and Sealed this
Eighteenth Day of September, 2012

David J. Kappos
*Director of the United States Patent and Trademark Office*